(12) United States Patent
Marchlewski et al.

(10) Patent No.: US 11,504,924 B2
(45) Date of Patent: Nov. 22, 2022

(54) MODULAR QUARTER PANEL FASCIA BRACKET

(71) Applicant: Ford Global Technologies, LLC, Dearborn, MI (US)

(72) Inventors: Jack Marchlewski, Saline, MI (US); Darrin Neil Wagner, Bloomfield Hills, MI (US); Robert Reiners, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 556 days.

(21) Appl. No.: 16/597,063

(22) Filed: Oct. 9, 2019

(65) Prior Publication Data

US 2021/0107570 A1 Apr. 15, 2021

(51) Int. Cl.
| | |
|---|---|
| *B29C 70/46* | (2006.01) |
| *B62D 25/16* | (2006.01) |
| *B62D 65/16* | (2006.01) |
| *B29C 65/56* | (2006.01) |
| *B29C 65/00* | (2006.01) |
| *B60Q 1/26* | (2006.01) |
| *B29K 307/04* | (2006.01) |
| *B29L 31/30* | (2006.01) |
| *B29K 67/00* | (2006.01) |
| *B29K 309/08* | (2006.01) |

(52) U.S. Cl.
CPC ............ *B29C 70/46* (2013.01); *B29C 65/565* (2013.01); *B29C 66/7212* (2013.01); *B60Q 1/2623* (2013.01); *B62D 25/163* (2013.01); *B62D 65/16* (2013.01); *B29K 2067/00* (2013.01); *B29K 2307/04* (2013.01); *B29K 2309/08* (2013.01); *B29L 2031/30* (2013.01)

(58) Field of Classification Search
CPC ... B29C 70/46; B29C 65/565; B29C 66/7212; B60Q 1/2623; B62D 25/163; B62D 65/16; B29K 2067/00; B29K 2307/04
See application file for complete search history.

(56) References Cited

U.S. PATENT DOCUMENTS

| | | | |
|---|---|---|---|
| 3,591,231 A | 7/1971 | Wessells et al. | |
| 5,139,285 A * | 8/1992 | Lasinski | B62D 25/163 280/849 |
| 5,228,742 A * | 7/1993 | Johnson | B62D 29/048 296/183.1 |
| 8,517,461 B2 | 8/2013 | Huber | |
| 10,843,640 B2 * | 11/2020 | Marchlewski | B62D 27/065 |
| 2005/0006927 A1 * | 1/2005 | Granger | B62D 25/163 296/191 |
| 2007/0216199 A1 | 9/2007 | Ito et al. | |

(Continued)

FOREIGN PATENT DOCUMENTS

EP 1319581 B1 8/2007

*Primary Examiner* — Lori L Lyjak
(74) *Attorney, Agent, or Firm* — Vichit Chea; Carlson, Gaskey & Olds, P.C.

(57) ABSTRACT

An apparatus and method, according to an exemplary aspect of the present disclosure includes, among other things, a quarter panel comprised of a sheet molding compound and a fascia bracket. The fascia bracket includes a first flange integrated into the quarter panel, a second flange comprising a vehicle body mount interface, and a gripping feature configured to grip a portion of a fascia to be attached to the quarter panel.

15 Claims, 3 Drawing Sheets

(56) References Cited

U.S. PATENT DOCUMENTS

| | | | |
|---|---|---|---|
| 2018/0171087 A1* | 6/2018 | Hanley | B32B 1/08 |
| 2020/0164923 A1* | 5/2020 | Marchlewski | B62D 65/16 |
| 2020/0217478 A1* | 7/2020 | Marchlewski | B60Q 1/2623 |
| 2021/0061364 A1* | 3/2021 | Marchlewski | B62D 25/02 |

* cited by examiner

MODULAR QUARTER PANEL FASCIA BRACKET

TECHNICAL FIELD

This disclosure relates generally to a quarter panel with an integrated fascia bracket having a vehicle body mount interface.

BACKGROUND

For vehicles that include a removable quarter panel, a separate fascia is needed to cover a sensor module such as a Blind Spot Information System (BLIS) module, for example. The fascia is also used to conceal fasteners that attach the quarter panel to a vehicle body. The quarter panel is typically made from sheet metal and includes a reinforcement bracket that is welded to the quarter panel, and which is used to attach the quarter panel to the vehicle body with a plurality of fasteners. A separate fascia bracket is fastened to the quarter panel to secure the fascia to the quarter panel. In order to replace or repair the quarter panel, it is time consuming to remove the various brackets and fasteners in order to gain access to the quarter panel.

SUMMARY

An apparatus according to an exemplary aspect of the present disclosure includes, among other things, a quarter panel comprised of a sheet molding compound and a fascia bracket. The fascia bracket includes a first flange integrated into the quarter panel, a second flange comprising a vehicle body mount interface, and a gripping feature configured to grip a portion of a fascia to be attached to the quarter panel.

In a further non-limiting embodiment of the foregoing apparatus, the first flange is bonded to the quarter panel.

In a further non-limiting embodiment of any of the foregoing apparatus, the first flange is riveted to the quarter panel.

In a further non-limiting embodiment of any of the foregoing apparatus, the fascia bracket comprises an injection molded component.

In a further non-limiting embodiment of any of the foregoing apparatus, the second flange is directly fastened to a vehicle body structure.

In a further non-limiting embodiment of any of the foregoing apparatus, the gripping feature comprises at least two gripping fingers spaced apart from each other by a gap, and wherein the portion of the fascia is received within the gap and is gripped by the at least two gripping fingers to provide a compression fitting.

In a further non-limiting embodiment of any of the foregoing apparatus, the portion of the fascia comprises a fascia flange extending outwardly from an interior surface of the fascia, and wherein the fascia flange is inserted into the gap to attach the fascia to the quarter panel.

In a further non-limiting embodiment of any of the foregoing apparatus, the quarter panel includes a panel flange extending outwardly from a main body of the quarter panel, and wherein the first flange of the fascia bracket is bonded directly to the panel flange.

In a further non-limiting embodiment of any of the foregoing apparatus, the first flange of the fascia bracket is bonded directly to an interior surface of the quarter panel.

In a further non-limiting embodiment of any of the foregoing apparatus, the fascia bracket comprises a single-piece bracket body having a solid center portion with the first flange being formed at one edge of the bracket body, the second flange being formed at an opposite edge of the bracket body, and the gripping feature being formed adjacent to the first flange.

An apparatus, according to yet another exemplary aspect of the present disclosure includes, among other things, a quarter panel comprised of a sheet molding compound and a fascia having a fascia flange extending outwardly from an interior surface of the fascia. A fascia bracket includes a first flange integrated into the quarter panel, a second flange comprising a vehicle body mount interface, and a gripping feature that grips the fascia flange to attach the fascia to the quarter panel.

In a further non-limiting embodiment of any of the foregoing apparatus, the fascia bracket comprises a single-piece bracket body having a solid center portion with the first flange being formed at one edge of the bracket body, the second flange being formed at an opposite edge of the bracket body, and the gripping feature being formed adjacent to the first flange.

In a further non-limiting embodiment of any of the foregoing apparatus, the fascia bracket comprises an injection molded component and wherein the first flange of the fascia bracket is bonded directly to the quarter panel during formation of the quarter panel such that the fascia bracket is permanently attached to the quarter panel.

In a further non-limiting embodiment of any of the foregoing apparatus, the first flange of the fascia bracket is bonded directly to an interior surface of the quarter panel, or the quarter panel includes a panel flange extending outwardly from a main body of the quarter panel, and wherein the first flange of the fascia bracket is bonded directly to the panel flange.

In a further non-limiting embodiment of any of the foregoing apparatus, the second flange is directly fastened to a vehicle body structure with at least one fastener, and wherein the fascia covers the at least one fastener and covers at least one sensor module when the fascia bracket is attached to the vehicle body structure and the fascia is attached to the fascia bracket.

A method according to still another exemplary aspect of the present disclosure includes, among other things, (a) forming a quarter panel out of a sheet molding compound; (b) providing a fascia bracket including a quarter panel mounting portion, a vehicle body mounting portion, and a gripping feature configured to grip a portion of a fascia to be attached to the quarter panel; and (c) bonding the quarter panel mounting portion of the fascia bracket to the quarter panel during step (a).

17. The method according to claim 16, wherein step (b) includes injection molding the fascia bracket as a single-piece component that includes a quarter panel flange comprising the quarter panel mounting portion, a vehicle body flange comprising the vehicle body mounting portion, and the gripping feature comprising at least two gripping fingers spaced apart from each other by a gap that receives a fascia flange in a compression fitting to attach the fascia to the quarter panel.

In a further non-limiting embodiment of the foregoing method, step (c) includes bonding the quarter panel flange of the fascia bracket directly to an interior surface of the quarter panel.

In a further non-limiting embodiment of any of the foregoing methods, the quarter panel includes a panel flange extending outwardly from a main body of the quarter panel, and wherein step (c) includes bonding the quarter panel flange of the fascia bracket directly to the panel flange.

In a further non-limiting embodiment of any of the foregoing methods, step (b) includes forming the fascia bracket as a single-piece bracket body having a solid center portion with the quarter panel flange being formed at one edge of the bracket body, the vehicle body flange being formed at an opposite edge of the bracket body, and the gripping feature being formed adjacent to the quarter panel flange.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary integrated fascia bracket having a vehicle body mount interface, and which is used to mount a fascia to cover a sensor module.

Figure 1:
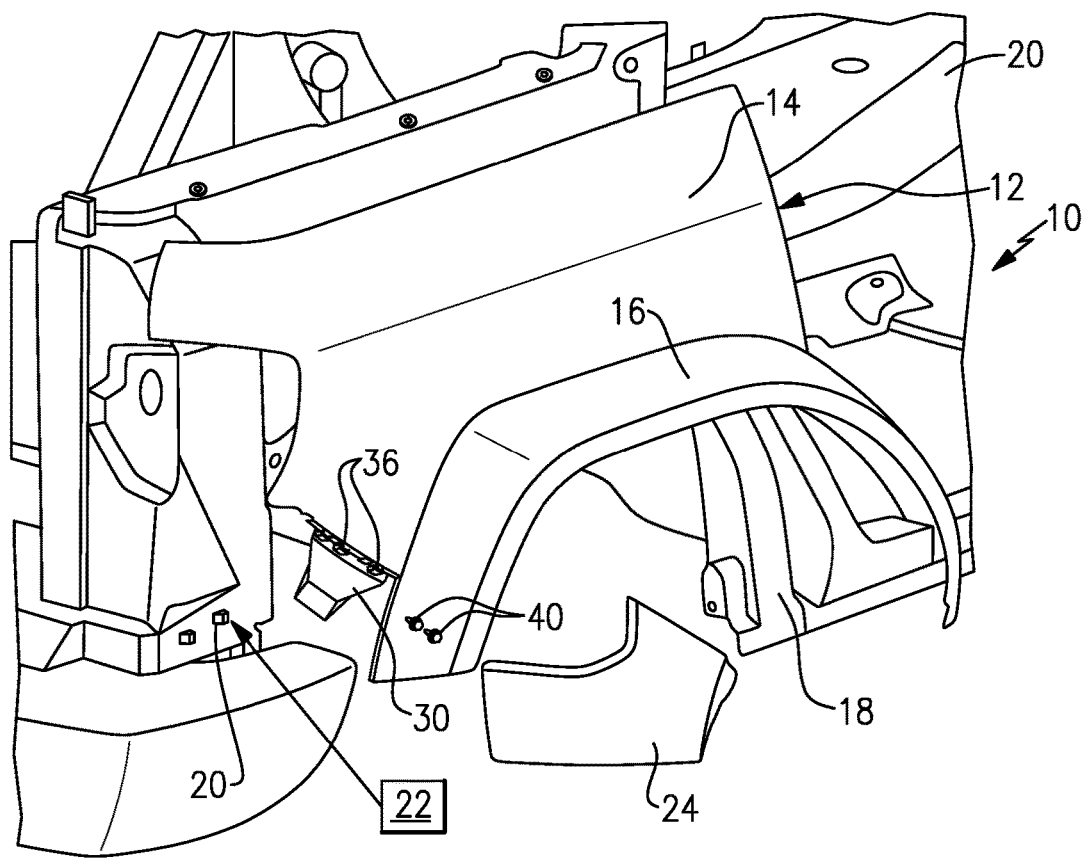
FIG. 1 illustrates a perspective view of a vehicle with a removable quarter panel with an integrated fascia bracket and an associated fascia that covers a sensor module.

FIG. 1 shows a vehicle 10 that includes a removable quarter panel 12. The quarter panel 12 has a main body portion 14 that forms an exterior surface for a rear quarter of the vehicle and a fender portion 16 that extends partially around a rear wheel well 18. The quarter panel 12 is removably attached to an inner vehicle body structure 20 such that the quarter panel 12 can be easily removed for repair or replacement.

In one example configuration, a sensor module 22 is mounted to the vehicle body structure 20 at a rear corner location. In one example, the sensor module 22 comprises a Blind Spot Information System (BLIS) module that communicates with a vehicle controller to notify a driver of objects located within a blind spot. Other sensor modules 22 could be mounted in this location in addition to, or instead of, the BLIS module. A separate fascia 24 is mounted to the quarter panel 12 to cover and protect the sensor module 22. The fascia 24 also conceals any fasteners that are used to attach the quarter panel 12 to the vehicle body structure 20.

A fascia bracket 30 is integrated with the quarter panel 12 and is used to attach the fascia 24 to the quarter panel 12. In one example, the quarter panel 12 is comprised of a sheet molding compound (SMC). SMC material is comprised of reinforced polyester with glass or carbon fibers, for example. For modular quarter panels 12 made of SMC material, the manufacturing process allows an injection molded component to be bonded during the manufacturing process of forming the quarter panel 12 without the need for a subassembly. In one example, the fascia bracket 30 comprises an injection molded plastic or metal component that is bonded to the quarter panel 12 to form an integrated bracket/quarter panel.

In one example, the fascia bracket 30 includes a first flange 32 that is integrated into the quarter panel 12, a second flange 34 that comprises a vehicle body mount interface, and a gripping feature 36 that is configured to grip a portion of the fascia 24. In one example, the first flange 32 is bonded directly to the quarter panel 12 as described above. Optionally, the first flange can be riveted to the quarter panel 12 with one or more rivets 38 as shown in FIG. 2B. The second flange 34 is directly fastened to the vehicle body structure 20 with one or more fasteners 40.

Figure 2A:
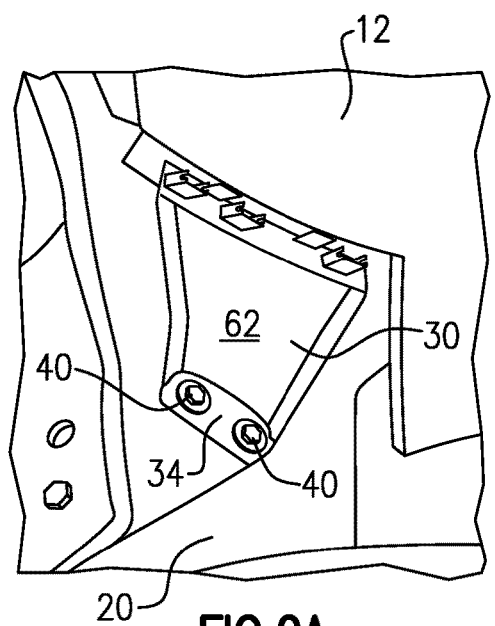
FIG. 2A is a top view of one example of the fascia bracket being integrated into the quarter panel.
Figure 2B:
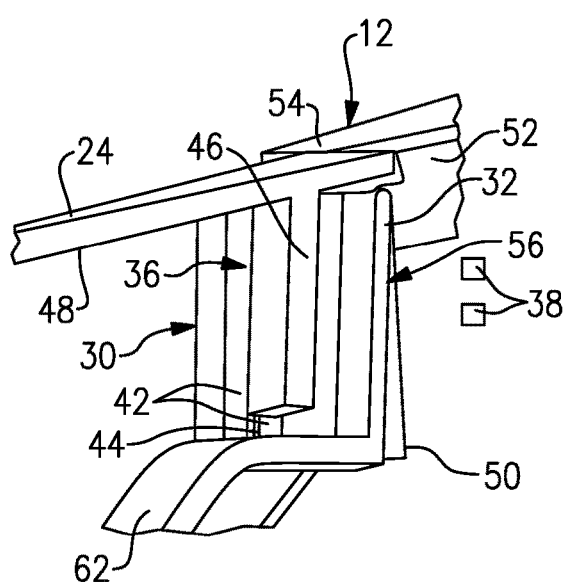
FIG. 2B is a section view of the quarter panel, fascia, and fascia bracket of FIG. 2A.
Figure 3A:
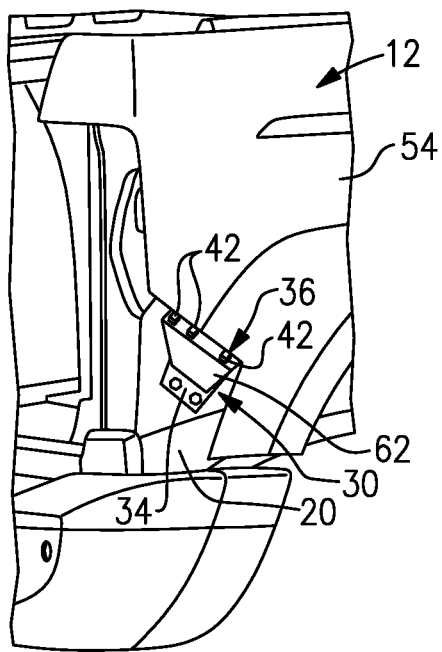
FIG. 3A is a top view of another example of the fascia bracket being integrated into the quarter panel.
Figure 3B:
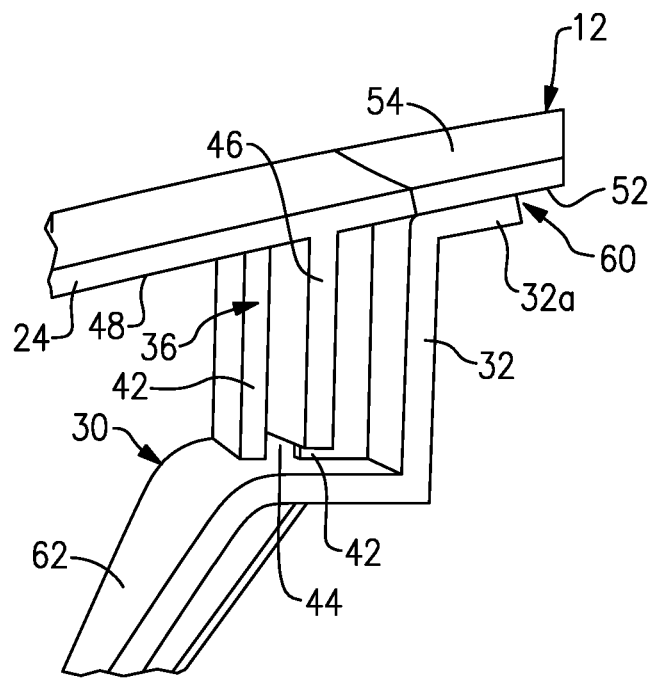
FIG. 3B is a section view of the quarter panel, fascia, and fascia bracket of FIG. 3A.
Figure 4:
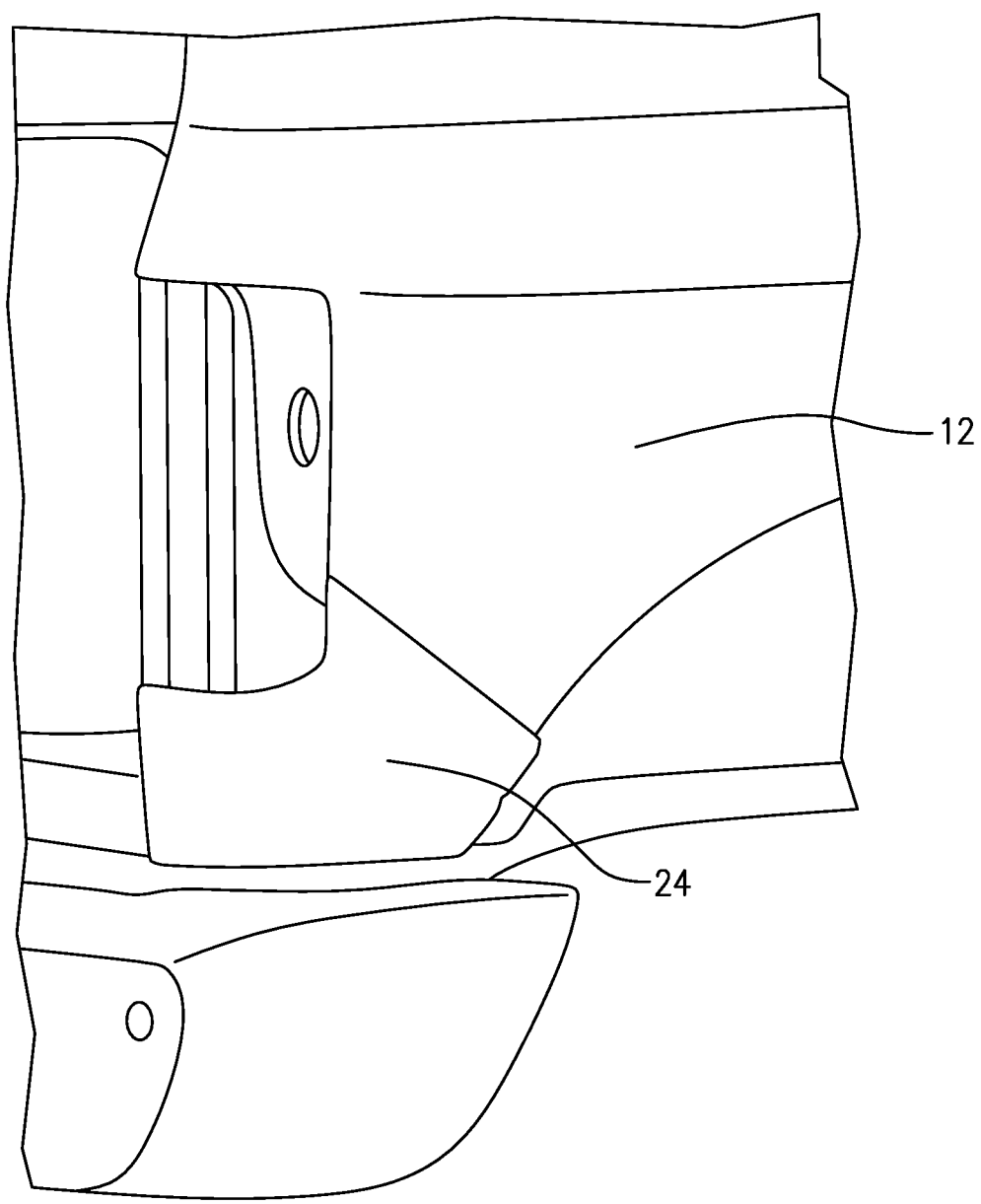
FIG. 4 is a perspective view of the fascia as assembled to the quarter panel and covering the sensor module.

In one example, the gripping feature 36 comprises at least two gripping fingers 42 spaced apart from each other by a gap 44 (FIGS. 2B and 3B). A portion of the fascia 24 is received within the gap 44 and is gripped by the gripping fingers 42 to provide a compression fitting of the fascia 24 to the quarter panel 12. In one example, the portion of the fascia 24 gripped by the fingers 42 is a fascia flange 46 extending outwardly from an interior surface 48 of the fascia 24. The fascia flange 46 is inserted into the gap 44 to attach the fascia 24 to the quarter panel 12. In the configuration shown, multiple gripping fingers 42 are provided to extend along a length of the fascia flange 46 to securely hold the fascia 24 in place.

The gap 44 is shown in FIGS. 2B and 3B just below a lower edge of the fascia flange 46. The gap 44 is sized such that as the fascia flange 46 is inserted into the gap 44 the resilient gripping fingers 42 flex outwardly from opposing sides of the flange 46. Once the flange 46 has been fully slid into place the fingers 42 tightly grip and hold the fascia 24 to the quarter panel 12.

FIGS. 2A-2B show one example of the fascia bracket 30 integrated into the quarter panel 12. In this example, the quarter panel 12 includes a panel flange 50 extending outwardly from an end edge or interior surface 52 of the quarter panel 12. An exterior surface 54 of the quarter panel faces opposite of the interior surface 52 and comprises the external surface of the vehicle 10. In this example, the panel flange 50 extends transversely to the interior 52 and exterior 54 surfaces of the quarter panel 12. The first flange 32 of the fascia bracket 30 is bonded directly to the panel flange 50 as shown at 56 in FIG. 2B. The lower portion of the first flange 32 is spaced from the panel flange 50 to show the bonding interface location; however, once bonded, the first flange 32 would be flush with the panel flange 50.

FIGS. 3A-3B show another example of the fascia bracket 30 integrated into the quarter panel 12. In this example, the first flange 32 of the fascia bracket 30 includes a transversely extending portion 32a that is bonded directly to the interior surface 52 of the quarter panel 12 as indicated at 60. The gripping feature 36 and the fascia flange 46 are the same configuration as shown in FIGS. 2A and 2B.

In one example, the fascia bracket 30 comprises a single-piece bracket body 62 having a solid center portion with the first flange 32 being formed at one edge of the bracket body 62, the second flange 34 being formed at an opposite edge of the bracket body 62, and the gripping feature 36 being formed adjacent to the first flange 32 as shown in FIGS. 2A and 3A. As discussed above, for modular quarter panels 12 made of SMC material, the manufacturing process allows an injection molded component to be bonded during the manufacturing process of forming the quarter panel 12. The thickness of the SMC material can be controlled such that additional reinforcing brackets are not required. The subject disclosure provides an injected molded fascia bracket 30 that is integrated/bonded into the quarter panel 12, and which includes an integrated vehicle body attachment interface to attach the bracket 30 directly to the vehicle body structure. This reduces the number of components that have to be removed in order to replace or repair the quarter panel.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
   a quarter panel comprised of a sheet molding compound; and
   a fascia bracket including a first flange integrated into the quarter panel, a second flange comprising a vehicle body mount interface, and a gripping feature configured to grip a portion of a fascia to be attached to the quarter panel.

2. The apparatus according to claim 1, wherein the first flange is bonded to the quarter panel.

3. The apparatus according to claim 1, wherein the first flange is riveted to the quarter panel.

4. The apparatus according to claim 1, wherein the fascia bracket comprises an injection molded component.

5. The apparatus according to claim 1, wherein the second flange is directly fastened to a vehicle body structure.

6. The apparatus according to claim 1, wherein the gripping feature comprises at least two gripping fingers spaced apart from each other by a gap, and wherein the portion of the fascia is received within the gap and is gripped by the at least two gripping fingers to provide a compression fitting.

7. The apparatus according to claim 6, wherein the portion of the fascia comprises a fascia flange extending outwardly from an interior surface of the fascia, and wherein the fascia flange is inserted into the gap to attach the fascia to the quarter panel.

8. The apparatus according to claim 1, wherein the quarter panel includes a panel flange extending outwardly from a main body of the quarter panel, and wherein the first flange of the fascia bracket is bonded directly to the panel flange.

9. The apparatus according to claim 1, wherein the first flange of the fascia bracket is bonded directly to an interior surface of the quarter panel.

10. The apparatus according to claim 1, wherein the fascia bracket comprises a single-piece bracket body having a solid center portion with the first flange being formed at one edge of the bracket body, the second flange being formed at an opposite edge of the bracket body, and the gripping feature being formed adjacent to the first flange.

11. An apparatus, comprising:
    a quarter panel comprised of a sheet molding compound;
    a fascia having a fascia flange extending outwardly from an interior surface of the fascia; and
    a fascia bracket including a first flange integrated into the quarter panel, a second flange comprising a vehicle body mount interface, and a gripping feature that grips the fascia flange to attach the fascia to the quarter panel.

12. The apparatus according to claim 11, wherein the fascia bracket comprises a single-piece bracket body having a solid center portion with the first flange being formed at one edge of the bracket body, the second flange being formed at an opposite edge of the bracket body, and the gripping feature being formed adjacent to the first flange.

13. The apparatus according to claim 12, wherein the fascia bracket comprises an injection molded component and wherein the first flange of the fascia bracket is bonded directly to the quarter panel during formation of the quarter panel such that the fascia bracket is permanently attached to the quarter panel.

14. The apparatus according to claim 13, wherein:
    the first flange of the fascia bracket is bonded directly to an interior surface of the quarter panel, or
    the quarter panel includes a panel flange extending outwardly from a main body of the quarter panel, and wherein the first flange of the fascia bracket is bonded directly to the panel flange.

15. The apparatus according to claim 14, wherein the second flange is directly fastened to a vehicle body structure with at least one fastener, and wherein the fascia covers the at least one fastener and covers at least one sensor module when the fascia bracket is attached to the vehicle body structure and the fascia is attached to the fascia bracket.

* * * * *